(12) United States Patent
Erwin et al.

(10) Patent No.: US 6,536,486 B2
(45) Date of Patent: Mar. 25, 2003

(54) BRAKE FLUSH METHOD

(76) Inventors: Harold E. Erwin, 1527 Washington La., Augusta, KS (US) 67010; Abram B. Kuipers, 1507 E. Kay St., Derby, KS (US) 67037

( * ) Notice: Subject to any disclaimer, the term of this patent is extended or adjusted under 35 U.S.C. 154(b) by 0 days.

(21) Appl. No.: 10/156,631

(22) Filed: May 28, 2002

(65) Prior Publication Data

US 2003/0037837 A1 Feb. 27, 2003

Related U.S. Application Data

(62) Division of application No. 09/935,741, filed on Aug. 22, 2001, now Pat. No. 6,443,192.

(51) Int. Cl.$^7$ .............................................. B65B 31/04
(52) U.S. Cl. ....................................................... 141/65
(58) Field of Search ............................ 141/98, 59, 65, 141/67, 286, 301, 302; 184/1.5

(56) References Cited

U.S. PATENT DOCUMENTS

| | | | |
|---|---|---|---|
| 5,015,301 A | 5/1991 | Baylor et al. | |
| 5,060,703 A | * 10/1991 | Koerner | 141/59 |
| 5,318,080 A | 6/1994 | Viken | |
| 5,361,870 A | 11/1994 | Courcy | |
| 6,206,055 B1 | * 3/2001 | Hollub et al. | 141/65 |
| 6,302,167 B1 | 3/2001 | Hollub | |
| 6,253,805 B1 | * 7/2001 | Erwin et al. | 141/59 |

* cited by examiner

*Primary Examiner*—Steven O. Douglas
(74) *Attorney, Agent, or Firm*—Shook Hardy & Bacon

(57) ABSTRACT

A method of flushing the brake system of a vehicle is provided by administering new brake fluid to the master cylinder under pressure while at the same time suctioning with a clear wand old brake fluid from a particular bleeder valve on the vehicle with all the remaining valves closed. Once the particular valve has been adequately bled, new brake fluid will be seen coming out of the valve through the clear wand, and the valve should be closed. This procedure is repeated for each of the remaining valves one at a time until all of the bleeder valves on the vehicle have been bled. Ideally, the first valve selected should be the one furthest from the master cylinder and the last valve selected should be the one closest to the master cylinder.

2 Claims, 2 Drawing Sheets

BRAKE FLUSH METHOD

CROSS-REFERENCE TO RELATED APPLICATIONS

This application is a divisional of U.S. patent application Ser. No. 09/935,741 filed Aug. 22, 2001, now U.S. Pat. No. 6,443,192.

STATEMENT REGARDING FEDERALLY SPONSORED RESEARCH OR DEVELOPMENT

Not applicable.

BACKGROUND OF THE INVENTION

This invention relates to the maintenance of automobile internal combustion engines and, more particularly, to a method and apparatus for flushing brake systems on such engines.

Automobiles, motorcycles, and numerous other vehicles typically use hydraulic brake systems for slowing and stopping. These hydraulic braking systems were first introduced in the mid-1920s.

A typical hydraulic brake system contains a pressurizing device, which is referred to as the master cylinder. When the vehicle's brake pedal is depressed, a sealed plunger within the master cylinder pushes against a volume of brake fluid causing the fluid to flow under pressure through brake activation devices. Some examples of such devices are proportioners and anti-lock brake sensors. Almost instantaneously after depression of the brake pedal the pressure from the master cylinder pushes against pistons in the wheel cylinders on the vehicle. These wheel cylinders apply pressure to brake shoes or pads forcing them against either a metal brake drum or disc shaped rotors.

Some common enemies to the typical braking system are the system contaminants of air and moisture in the system. Any air in the system will compress and prevent the applied pressure from the master cylinder from being properly transferred to the wheel cylinders. Any moisture in the brake fluid will boil under the heat from the friction generated between the stationary brake shoes or pads and the moving metal rotor or drums. Any such boiling results in steam which can interfere with the direct transfer of pressure from the brake pedal to the wheel cylinder in much the same manner as results from air contamination. The presence of either air or steam within the brake system can result in severe safety concerns because the vehicle may not be able to stop as quickly as designed.

Similar air and moisture problems can occur in manual transmission clutch systems because these systems are operated by very similar hydraulic systems as are brake systems. In fact, often the same fluid is used.

The components in both brake and clutch systems are manufactured of such materials as rubber, aluminum, cast iron, steel, and brass. These materials may deteriorate as the result of exposure to moisture (i.e., may rust, decay, etc.). Further, movement of the master cylinder, hydraulic reactionary devices, and wheel cylinders create wear particles that eventually contaminate the brake fluid making it necessary to replaced the existing old fluid with new brake fluid.

A very popular method of flushing and bleeding brake systems is the pressurized method. This is accomplished by bleeding the brake system under pressure to remove the old fluid. The pressurized method is the only way to properly flush most modern anti-lock brake systems.

Other prior art methods exist in which a vacuum is applied to the bleeder valve of each wheel cylinder and the fluid is pulled out of the system. This method is unsatisfactory because contaminating air oftentimes is sucked in around the loosened bleeder valve. Additionally, the vacuum method is not strong enough to open some anti-lock brake systems to ensure removal of the old fluid. Because of these disadvantages, pressurized flushing remains the most popular method of changing out brake fluid.

The apparatus most commonly used to accomplish pressurized flushing bleeding of brake or clutch systems has been around for many years, and is commonly referred to as a "brake-bleeder ball." The prior art brake-bleeder ball is essentially a tank consisting of two halves or pieces arranged one on top of the other. These two halves of the tank are divided by a flexible diaphragm, the outer edges of which are clamped between the edges of the two halves of the tank. These two halves are bolted together to clamp the outer edge of the diaphragm. The bottom half of the tank has an opening to allow for the entry of pressurized air. The upper half of the tank has two openings. The diaphragm dividing the halves is not taut, rather it is loose so that it may be pushed towards the bottom of the tank when the upper half of the tank is filled with the new fluid. The first opening in the upper portion is capped once the new fluid is loaded. After replacing the cap, the second opening in the upper portion is used to expel fluid from the tank under pressure when the lower half of the tank is pressurized due to the introduction of air through the opening in the bottom half compartment. More specifically, the diaphragm is pushed by air pressure in the bottom half of the tank towards the upper half of the tank to expel fluid. The new fluid expelled from the upper half of the tank is used to flush and bleed a brake or clutch system under pressure.

In order to refill the prior art brake bleeder ball, the user is required to first manually force the flexible diaphragm towards the bottom half of the tank using a blunt object. This is done so that the diaphragm conforms to the bottom half of the tank in such a manner as to allow room for the new brake fluid to be received by the tank. If the diaphragm is not pushed down in this manner and is left inverted towards the top half of the tank, there is no capacity for adding the new brake fluid. After the diaphragm is in position, new brake fluid is manually poured in the tank using a funnel. Once the tank is filled, the prior art bleeder-ball system is ready to be used for pressurized flushing.

However, using this prior art bleeder-ball system for pressurized flushing and bleeding has numerous disadvantages.

The primary disadvantage of such a system is that it allows for contamination of the new brake fluid. Brake fluid is extremely hydroscopic, meaning that it will absorb large amounts of moisture directly from the air it comes into contact with. Therefore, it is extremely important that the new brake fluid be allowed as little contact with air as possible. When the diaphragm is pushed down and new brake fluid is poured into the tank, there is a high level of contact between the air and the new fluid. Additionally, because there is no way for the user to know how much new fluid is left in the tank after each brake flush it is impossible to know when the tank is empty enough to accommodate the entire contents of a new fluid container purchased in the marketplace. Marketed containers of new fluid are sealed from contact with the air and are intended to remain that way until use. However, because there is no way to tell when the prior art tank is almost empty, users often fill the tank earlier than is necessary to avoid the unfortunate situation of running out of pressurized fluid in the middle of the flushing process. As a result, users often will fill the tank earlier than is necessary, leaving partially filled, air exposed and unsealed containers on the shelf which allow new fluid to absorb undesirable moisture. In addition to this disadvantage of leaving around half emptied containers of fluid, there is also the risk that the unknown fluid level in the tank will cause the user to run out of fluid in the middle of the flushing process. This may result in the waste of large quantities of fluid and cause additional air contamination within the brake system. Further, the aforementioned use of a blunt object to push the diaphragm down can also cause the real possibility of puncturing the diaphragm causing contaminating air to bubble within the new fluid being administered to the brake system while under pressure. Other sources of contamination in such prior art systems result from the pouring of the fluid into a funnel for insertion into the container, the splashing of the fluid within the air filled tank after it leaves the funnel, and the air allowed into the tank every time the fill cap is removed and reinserted. As already mentioned above, contamination of the brake fluid can cause the brakes to become dangerously nonresponsive to compression of the brake pedal.

Another source of contamination is from shards, threads, or other solid impurities materials that may fall into the tank each time the filling plug is removed and then installed again. Similar impurities may also be introduced into the tank by the blunt object used to push the diaphragm back into position. Solid impurities can destroy the effectiveness of the brake system and lead to unnecessary repairs.

Because contamination by air, moisture, or solid impurities in brake fluid can dangerously compromise the effectiveness of a vehicles brakes, it is imperative that new fluid used to flush remain pure throughout the process.

BRIEF SUMMARY OF THE INVENTION

It is therefore an objective of the present invention to provide a method and apparatus for flushing and bleeding vehicle brake systems that is simple and effective.

More particularly, it is an object of the present invention to provide a method and apparatus for flushing and bleeding the brake system of a vehicle in a manner in which the new brake fluid used is not exposed to air or other impurities.

It is a further objective of the present invention to provide a method and apparatus for indicating when the new fluid remaining within the tank is close to being empty and needs refilling.

BRIEF DESCRIPTION OF THE SEVERAL VIEWS OF THE DRAWING

In the accompanying drawings which form a part of the specification and are to be read in conjunction therewith and in which like reference numerals are used to indicate like parts in the various views.

DETAILED DESCRIPTION OF THE. INVENTION

Figure 1:
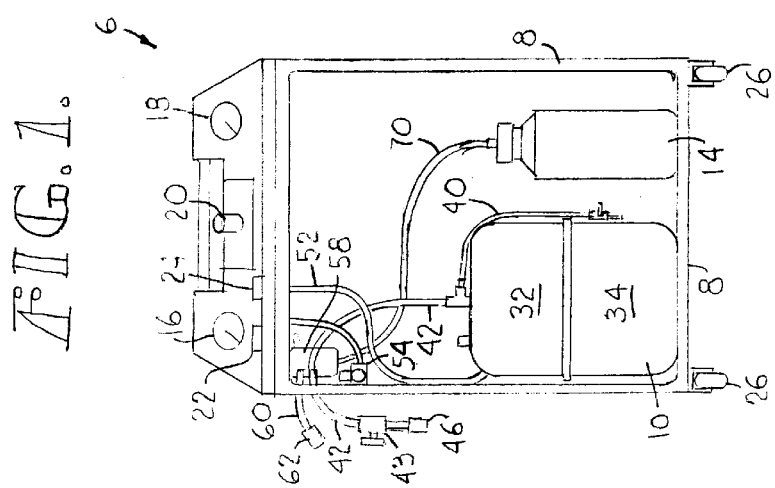
FIG. 1 is a side, elevational view of the flushing system of the invention.

Referring to the drawings, FIG. 1 shows the overall brake service system 6 as it appears to the user. The system consists of a frame 8 onto which a tank 10 is mounted, a used fluid container 14, a suction hose 60, a pressurized new fluid hose 42, a recharge hose 40, a suction gauge 16, a pressure 18 gauge, a regulator 20, a system mode valve 22, and a suction valve 24. FIG. 1 also shows applicant's brake servicing system on wheels 26 so that it is mobile.

Figure 2:
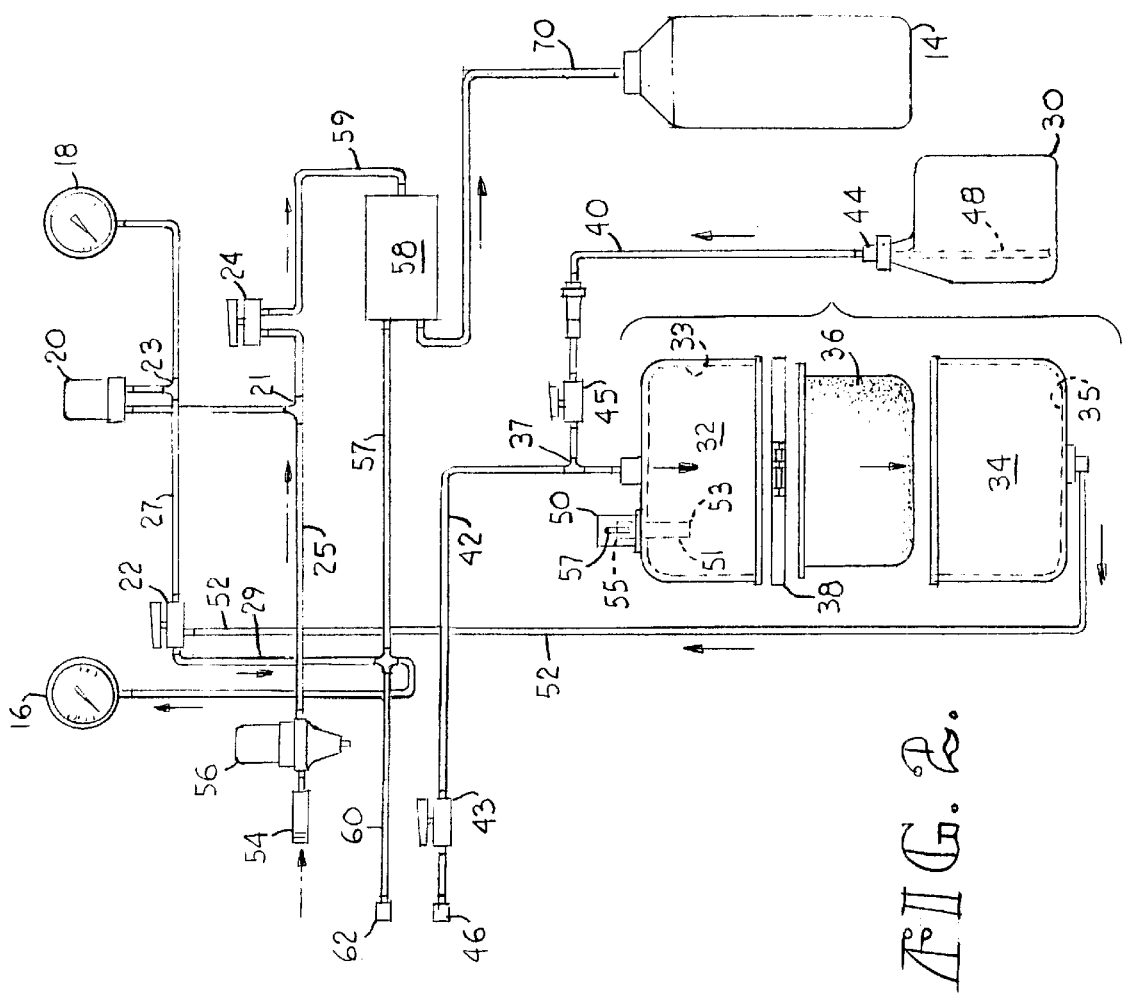
FIG. 2 is a schematic diagram of the invention in recharging mode.

The schematic drawing of FIG. 2 depicts tank 10, new brake fluid container 30, used brake fluid container 14, and a control system of the present invention. Tank 10 is made of two halves 32, 34 which are divided by a flexible diaphragm 36. Halves 32, 34 may be bolted or clamped together (a bolt tightened clamp 38 is disclosed in FIG. 2). However, the method of assembling the container could be accomplished numerous other ways (i.e., using bolts). Clamped between each of the upper half 32 and lower half 34 of the tank 10, flexible diaphragm 36 is sealed around its edges where it is trapped between the rims of the upper half 32 and lower half 34. The flexible diaphragm 36 should be substantially impermeable to both air and brake fluid so as to divide the tank into sealed off upper and lower chambers, 33 and 35 respectively (in FIG. 2 and FIG. 3) which vary in size depending on the position of the flexible diaphragm 36.

On the upper half of the tank 32 is an indicator 50 which is used to alert the user when the tank 10 is near empty and only has one or maybe two services left. Indicator comprises a pin 51 with first 53 and second 55 ends. The first end 53 comes into contact and moves consonant with the bladder 36 when the bladder is near the upper half 32 of the tank 10. This bladder position means that only one or two services of fluid are left and that the tank should thus be refilled to avoid running out of fluid during servicing. Second end 55 of the pin 51 is slidably received by a pin receiver 50 mounted on the tank. Pin receiver 50 also has a sight glass 57 allowing the user to observe the pin when it is pushed up into the pin receiver 50 thus indicating that refilling of the tank is necessary. The pin 51 is prevented from dropping into the tank using a catch (not pictured) in a manner known to those skilled in the art.

Also located on the top of tank 10 is a junction 37. Junction 37 serves as the common entry for two hoses: a recharge hose 40, and a pressurized fluid hose 42. The recharge hose 40 and the pressurized fluid hose 42 meet at a junction 37 before entering the upper chamber 33 of tank 10. Recharge hose 40 is used to draw new brake fluid from a new container 30 of fluid into tank 10. Pressurized new fluid hose 42 is used to distribute new fluid from tank 10 into the vehicle being serviced (not pictured). The ends of suction hose 60, pressurized fluid hose 42, and recharge hose 40 each have quick connectors with breakaway valves (62, 46, and 44 respectively) which are automatically closed when the hoses are disconnected from either a metal wand 48 or a clear plastic wand (not pictured). Both metal wand 48 and plastic wand are hollow and tubular. Either wand may be snap-fit into mating quick connectors 62, 46, 44 on the suction hose 60, pressurized fluid hose 42, and recharge hose 40. When either wand is attached to the quick connectors on any of these hoses, the normally closed breakaway valve on the particular hose in use is opened up and brake fluid is allowed to flow there through.

When a wand is connected to the pressurized fluid hose 42, a pressurized fluid control valve 43 may be used to control the rate of flow or completely shut off flow. This enables the user to quickly change or shut off the flow of pressurized fluid to the serviced vehicle when necessary. Recharge hose 40 has a recharge control valve 45 used to control or completely shut off the flow of new fluid to the tank 10 during filling. Valves 43, 45 may be standard ball valves or anything functionally similar.

At the bottom half of the tank 34, an air line 52 is tapped in below the flexible diaphragm 36 to pressurize or vacuum the lower chamber 35. Pressurization of the lower chamber 35 causes diaphragm 36 to move upward in the tank 10 (See FIG. 3) whereas vacuum pulls diaphragm 36 downward as the result of applied suction to the bottom chamber 35 in the tank.

The control system is powered by a pressurized air source 54 regulated by a preset regulator 56 which controls the air pressure introduced into the entire system. After passing through the preset regulator 56, the pressurized air enters the control system through an air feed line 25. A regulator 20 receives air from the air feed line 25 at an upstream tap 21 and delivers air to a regulator air line 27 at a downstream tap 23. Regulator 20 is used to set the pressure in regulator air line 27 at a lower constant pressure than exists in the air feed line 25. Downstream from regulator 20 the regulator air line 27 connects with mode valve 22.

Mode valve 22 is a standard three-way valve and has two settings. The first setting opens up flow between the regulator air line 27 and the tank air line 52 and closes off the back loop air line 29. This allows pressurized air received from the pressurized air source 54 to pass to the regulator 20 from the upstream tap 21 through the regulator 20 and into the regulator air line 27 at the downstream tap 23. From the regulator air line 27, the air flows through the mode valve 22 and then through the tank line 52 to pressurize the lower chamber 35 in the tank. The second setting of the mode valve 22 opens up the connection between the back loop line 29 and the tank line 52. When the pump 58 is in operation, this setting allows the vacuum line 57 of the air pump 58 to suck air from the back loop line 29. The vacuum in the back loop line then draws air from the lower chamber of the tank 35 through the tank line 52 creating a vacuum in the lower chamber 35. The vacuum lowers the bladder 36 which by suction draws new fluid into the tank. The third setting closes off all flow through the valve.

Pump 58 is powered by the pressurized air source 54 via air feed line 25. Air feed line 25 contains a suction valve 24. The suction valve 24 may be either open to activate the pump 58, or closed to deactivate the pump 58. When activated, the pump 58 can be used to move either air or fluid depending on the systems mode of operation. Pump 58 can be used to provide vacuum to the lower chamber 35 of the tank 10 when the tank 10 is filled or can be used to suction dirty brake fluid from the vehicle being serviced. When suctioning dirty brake fluid, suction hose 60 is used. Like the pressurized new fluid hose 42 and recharge hose 40, suction hose 60 has a quick connector 62 with a breakaway valve for receiving a wand. The plastic wand, rather than the metal wand 48, is usually used with the suction hose 60. Once the plastic wand is snapped in to the connector 62, the breakaway valve is automatically opened up, allowing flow. The wand can then be tapped into either the master cylinder or attached to one of the bleeder valves on the vehicle to suck out dirty fluid. Once the dirty fluid is drawn through the suction hose 60 to the pump 58, it exhausts through a dump hose 72 into used fluid container 14. A suction gauge 16 in communication with suction hose 60 measures the vacuum provided to remove dirty fluid from the serviced vehicle.

The present system operates in essentially six different modes. The first mode prepares tank 10 for filling. The second mode fills tank 10 by sucking new fluid from a commercially purchased new fluid container 30. The third mode purges the tank after filling. The fourth mode vacuums dirty fluid out of the master cylinder. The fifth mode fills the master cylinder with new brake fluid. Finally, the sixth mode flushes the vehicle's brake system by delivering pressurized fresh fluid to the master cylinder while suctioning old fluid from the vehicle's wheel cylinders.

First Mode of Operation: Preparing the Tank

To prepare the tank for filling, plastic wand should be snapped into the end of the recharge hose 40. The plastic wand can then be placed in a used fluid container 14. A pressurized air supply 54 should be attached to the pressurized air inlet 54. Mode valve 22 should be switched to its first setting, opening up the pressurized regulator air line 27 to the tank line 52. Suction valve 24 should be turned into off position to disable the air pump 58, since no suction is needed in this mode. Regulator 20 should be set to a moderate setting using pressure gauge 18. The pressurized air supply should now be turned on. After activation of the pressure, lower chamber 35 will be pressurized. As the lower chamber 35 of the tank is pressurized, it will push diaphragm 36 towards the upper half of the tank 32 causing diaphragm 36 to conform to the inner surface of the upper half 32 of tank 10. When diaphragm 36 nears the top, pin 51 is pushed up out of the tank and into a sight glass 50 thus notifying the user that the diaphragm 36 is in the appropriate position for loading the tank with fresh brake fluid. Another indication that the diaphragm is in the desired position is that air is no longer being emitted from the end of the plastic wand. When no more air comes out of the wand, the upper chamber 33 of the tank is almost completely void of air. Now the tank is ready for filling.

Second Mode of Operation: Filling the Tank

After preparing the tank as shown above, recharge control valve 45 should be closed. Next, the plastic wand should be removed from the connector 44 on the recharge hose 40 and replaced with the rigid tubular metal wand 48. FIG. 2 is a schematic representation of the second mode of operation. A new container of brake fluid 30 should then be obtained and should be inspected to make sure that the container is still sealed and has not been exposed to air. Metal wand 48 should now be placed within the new fluid container 30 all the way to the bottom. Valve 43 should be closed and an open-ended adapter (not shown) attached to the end of the dump hose 70 so that air can be exhausted therefrom. Mode valve 22 should then be switched to its second position which connects the back loop line 29 to the tank line 52 and seals off the regulator air line 27. The suction valve 24 is then opened up thus allowing the air pressure into the system to activate the air pump 58. Once in operation, pump 58 drops pressure in the vacuum line 57 which draws air from the back loop line 29. Because the back loop line 29 is now opened up to the tank line 52, air is drawn there-through creating a vacuum in the lower chamber 35. Recharge valve 45 should then be opened. The vacuum in the lower chamber. 35 pulls the diaphragm 36 down from its earlier position at the upper half of the tank 32. This draws brake fluid from new container 30 through recharge hose 40 into upper chamber 33 by suction. The recharge valve 45 can be used to control the rate of flow of fluid to the tank 10. Because the system is substantially sealed, the new fluid does not come into any significant contact with air. As the tank 10 is being loaded, the user can visually observe the brake fluid level in the container 30 because such containers are usually transparent. Of course, the user can also tell that all of the brake fluid has been consumed by the sound or air (rather than fluid) entering the recharge hose 40. Once the new brake fluid has been loaded into the tank 10 from the container 30, the tank is said to be "recharged".

Third Mode of Operation: Purging the Tank

The tank must now be purged in order to eliminate any excess air that may have entered the tank at the end of the process of drawing the new fluid out of the container 30. Metal wand 48 should be connected to the end 46 of the new fluid hose 42 within new fluid container 30. Air pump 58 should now be disabled by turning suction valve 24 back into off position. Next, the mode valve should be switched back to its first position so that the lower chamber is again pressurized. Regulator 20 should be set at a slightly lower pressure (5–10 psi) than was used to initially prepare the tank. The metal wand 48 should dispense air and then fluid. Once fluid appears coming out of the end of the metal wand, the recharge valve should be closed. The system is now substantially purged of air and ready for use in the servicing of a brake system for a motor vehicle.

Fourth Mode of Operation: Vacuuming Out the Master Cylinder

The fourth mode of operation of the present invention involves its use to vacuum out the master cylinder of old brake fluid. The master cylinder 82 should be vacuumed using the plastic wand. The plastic wand should be snapped on to the quick connector 62 on the end of the suction hose 60 thus opening up the break-away valve for free flow. The cap (not shown) on the master cylinder 82 of the vehicle to be serviced should then be removed and the plastic wand inserted therein. The mode valve 22 should remain in its second position so that the regulator air line 27 remains in connected to the tank line 52. The dump hose 70 should be connected to empty into a used fluid container 14. The new fluid container 30, just emptied as a result of filling the tank 40, can be used for this purpose. Before beginning suction, each of the bleeder valves on each of the vehicle's wheel cylinders should be opened and checked to determine whether they are not plugged and are otherwise functioning properly. Any defective valves should be replaced before beginning suction. After the bleeder valves have been checked, they should be closed.

The suction needed to remove the old fluid is provided by the pump 58 which is activated by placing the suction valve 24 in open position. Once suction valve 24 is opened, pressurized air flows through the air feed line 57 and suction valve 24 to a pump inlet line 59 to power pump 58. As note above, pump 58 may be used to draw either air or fluid. As can be recalled, pump 58 was used in the second mode to vacuum air from the lower chamber 35 to load the tank. Here, however, pump 58 is being used to vacuum dirty fluid from the master cylinder 82. The dirty fluid is vacuumed via the plastic wand, through suction hose 60, through vacuum line 57, through pump 58, out dump hose 70, and into used fluid container 14.

Fifth Mode of Operation: Filling the Master Cylinder

Once the old brake fluid has been completely removed from the master cylinder, the user is ready for the fifth mode of operation which is the filling of the master cylinder with new brake fluid. For filling the master cylinder 82, valve 43 on pressurized new fluid hose 42 should be closed and metal wand 48 snap-fit into connector 46 at the end of hose 42. Suction valve 24 should be turned off to deactivate pump 58. Regulator 20 should then be opened to allow air pressure from the air feed line 25 to pass through regulator 20 into regulator air line 27 through mode valve 22 through tank line 52 and into the lower chamber of the tank 10. The metal wand 48 should then be placed in the still uncapped master cylinder 82 on the vehicle to be serviced. The master cylinder is then filled by opening the valve 43 on the pressurized new fluid line 42 allowing the diaphragm to push new fluid up out of the tank 10, through the pressurized fluid hose 42 and out the metal wand 48 into the master cylinder. Flow rate to the master cylinder may be controlled by valve 43 on the pressurized new fluid hose 42. Once the master cylinder is substantially full of fluid, valve 43 on the pressurized new fluid hose should be closed.

Sixth Mode of Operation: Pressurized Flushing

Figure 3:
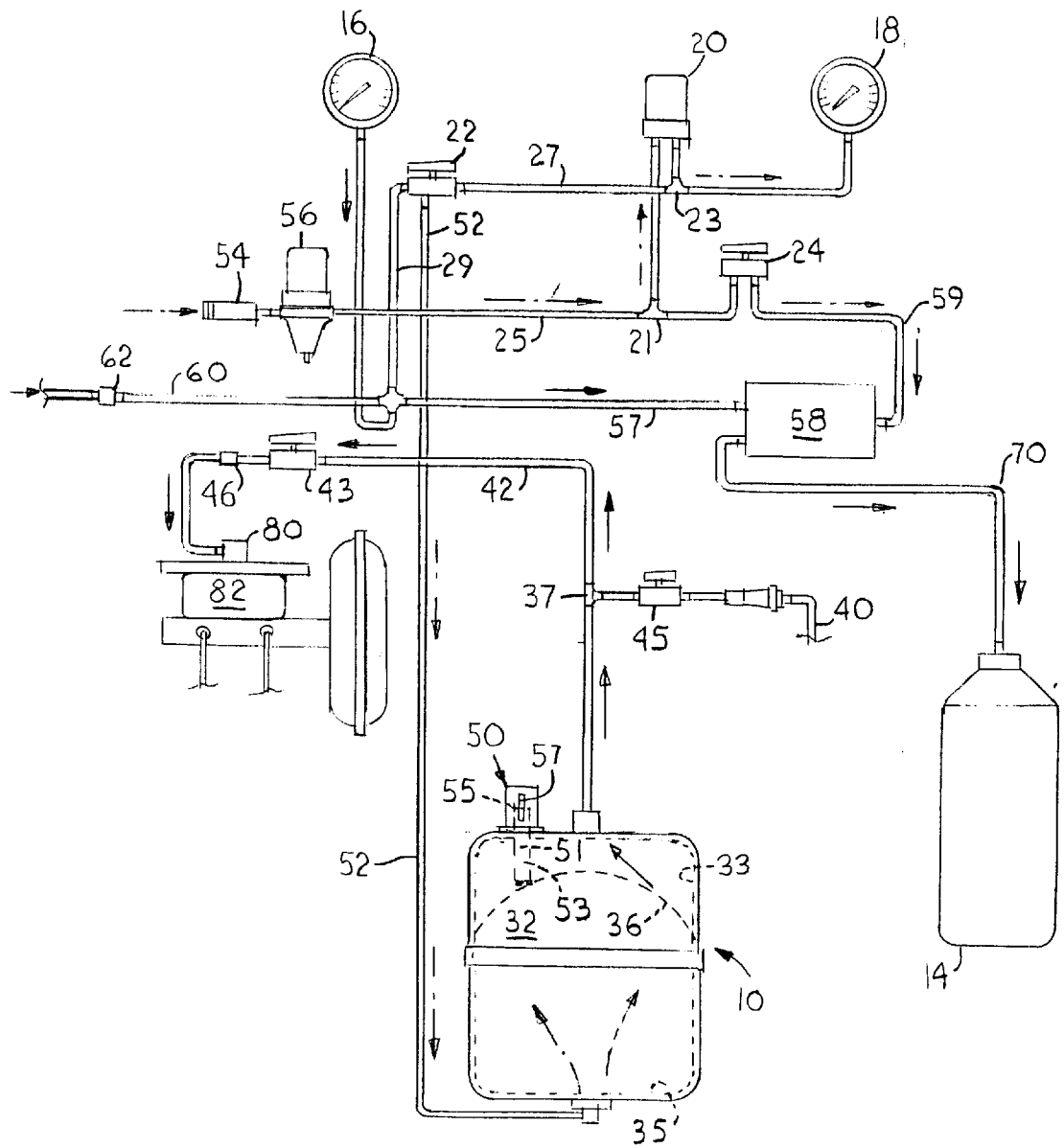
FIG. 3 is schematic diagram of the invention in pressurized/bleeding. mode.

The sixth and final mode of operation of the present invention is the actual flushing or bleeding of the brake system and is shown schematically in FIG. 3. First, a master cylinder reservoir adaptor 80 is screwed onto the master cylinder 82 in place of the removed cap. Adapter 80 seals master cylinder 82 and has an entry port enabling the system to be flushed with new fluid under FIG. 3, pressure in a manner known to those skilled in the art. The connector 46 on the end of the new fluid hose 42 is then snap-fit onto a reciprocal connector on adapter 80. Regulator 20 should then be set to desired system pressure (usually indicated by the vehicle manufacturer). The desired pressure will typically be higher in more modern anti-lock brake systems as opposed to more traditional systems. Mode valve 22 should remain in its second position with the regulator air line openly connected to the tank air line 52.

The user should.then select the farthest wheel from master cylinder 82, generally the passenger side rear, and connect the plastic wand to the selected bleeder valve at that location. Once the plastic wand is connected to the bleeder valve, suction valve 24 should be opened up to power pump 58 and valve 43 on the new fluid hose 42 should also be opened. Opening valve 43 causes pressurized fluid to flow from the upper chamber of the tank 33 through the new fluid hose 42 to the adapter on the master cylinder 82 to pressurize it with new fluid. The pressure needed to accomplish bleeding of each of the wheel cylinders may be adjusted by regulator 20. The pressurized new fluid being delivered to the master cylinder 82 forces new brake fluid through the wheel cylinder lines which, simultaneously pushes old brake fluid out of the individual bleeder valves located on each wheel cylinder into the suctioning plastic wand, and then to the used fluid container 14. The vacuum created by pump 58 in vacuum line 57 draws old brake fluid through the suction hose 60 from the bleeder valves on the wheel cylinders of the serviced vehicle. The old fluid is then taken through pump 58 and exhausted to the dump hose 70 to the used fluid container 14. The plastic wand is preferably made of clear plastic to enable the user to observe flow of fluid therein. When the brake fluid runs clear, the bleeder valve should be closed and the plastic wand removed. The user should then move to the next furthest wheel cylinder from the master cylinder and so on until all of the wheel cylinders have been effectively bled by the system. This completes the pressurized flushing process.

Once pressurized flushing is completed, master cylinder 82 should be topped off with more new brake fluid if necessary (using the same procedures provided for above under the master cylinder filling Mode) and the original master cylinder cap replaced.

The vacuuming, refilling, and pressurized flushing steps (or modes) above will be repeated several times depending on how many vehicles can be serviced until the tank needs to be refilled. Indicator 50 informs the user when the tank is near empty. This will occur when there are only one or two services worth of brake fluid remaining in a tank. The novel method of indicating, as explained earlier above, notifies the user that the tank is nearly empty when pin 51 appears in sight glass 55 located on pin receiver 50 on upper half 32 of tank 10. Routine checking of whether or not pin 51 is visible in sight glass 55 will enable the user to prevent the unfortunate circumstance of running out of brake fluid in the middle of servicing a particular vehicle. This problem in the prior art bleeder-ball systems may lead to the accidental introduction of air into the brake system as well as the waste caused by having to unnecessarily purging the system to remove accidentally introduced air.

As shown above, the present invention overcomes the disadvantages in the prior art bleeder ball systems by providing both [1] an air-free method of filling a tank with new brake fluid, and [2] an indicator which alarms the user when the fluid level in the tank is low enough to warrant refilling (or recharging) the tank with new brake fluid. By enabling the user to fill the tank without the use of a fill cap, funnel, or blunt object to push the flexible diaphragm back into place, the present invention avoids significant contamination present in the prior art systems. Because the brake fluid is loaded by vacuuming fluid into the tank rather than pouring air contact is minimized.

An additional advantage of the present invention is that the volume of the tank is such that it can contain the total amount of brake fluid in the new fluid container. This enables an entire container of new brake fluid to be consumed by the tank without having any new brake fluid left over. Left over, partially-filled containers of brake fluid can contribute to contamination by the absorption of moisture.

The indicator of the present invention provides a further advantage in that it alerts the user when only one or two services worth of fluid are remaining, and the tank should be refilled. This avoids the prior art problem of running out of brake fluid in the middle of servicing a vehicle.

As can be seen from the above disclosure, the new method of bleeding brake systems and the apparatus for accomplishing the same overcomes numerous deficiencies in the prior art bleeder-ball systems and allows the user to service brake systems for motorized vehicles in a new more efficient manner.

Thus, there has been shown and described a brake service system which fulfills all of the object and advantages sought therefore. Many changes, modifications, variations, and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

What is claimed is:

1. A method of bleeding a brake system on a vehicle having a master cylinder and a plurality of bleeder valves, the method comprising:

opening a first bleeder valve selected from said plurality while leaving the remaining bleeder valves of said plurality closed;

pressurizing the master cylinder with new brake fluid while simultaneously vacuuming old fluid from said first bleeder valve;

determining a time when a sufficient amount of old fluid has been drained from said first bleeder valve;

closing said first bleeder valve at or immediately thereafter said time; and repeating all of these steps for each of said remaining bleeder valves one at a time.

2. The method of claim 1 including the additional step of:

selecting as said first bleeder valve the one furthest from the master cylinder and ending with the bleeder valve closest to the master cylinder.

\* \* \* \* \*